United States Patent
Catalina, deceased

[15] 3,680,615
[45] Aug. 1, 1972

[54] METHOD OF AND APPARATUS FOR PREPARING FRUITS OR VEGETABLES

[72] Inventor: Edward L. Catalina, deceased, late of Milpitas, Calif. by Doris M. Catalina, 64 Whittier St., Milpitas, California, 95035, administratrix

[22] Filed: Nov. 19, 1969
[21] Appl. No.: 877,973

[52] U.S. Cl. .................................. 146/42, 146/78 R
[51] Int. Cl. ....................... A23n 15/00, B26d 3/26
[58] Field of Search .............. 146/78 R, 78 A, 33–42, 146/141, 145, 158

[56] References Cited

UNITED STATES PATENTS 2,741,285  4/1956  Lee ............................ 146/106
3,057,386  10/1962  Massaro ....................... 146/78

Primary Examiner—Willie G. Abercrombie
Attorney—Paul B. Fihe

[57] ABSTRACT

Method and apparatus for preparing spheres and other fancy cuts of potatoes or other fruits and vegetables wherein each raw product is initially cored to provide a cylindrical core member of regular cross-section, the core members are fed intermittently, a variable distance along their longitudinal axes in sequence, and are, during periods between feeding, acurately cut transversely to provide the finished products.

5 Claims, 10 Drawing Figures

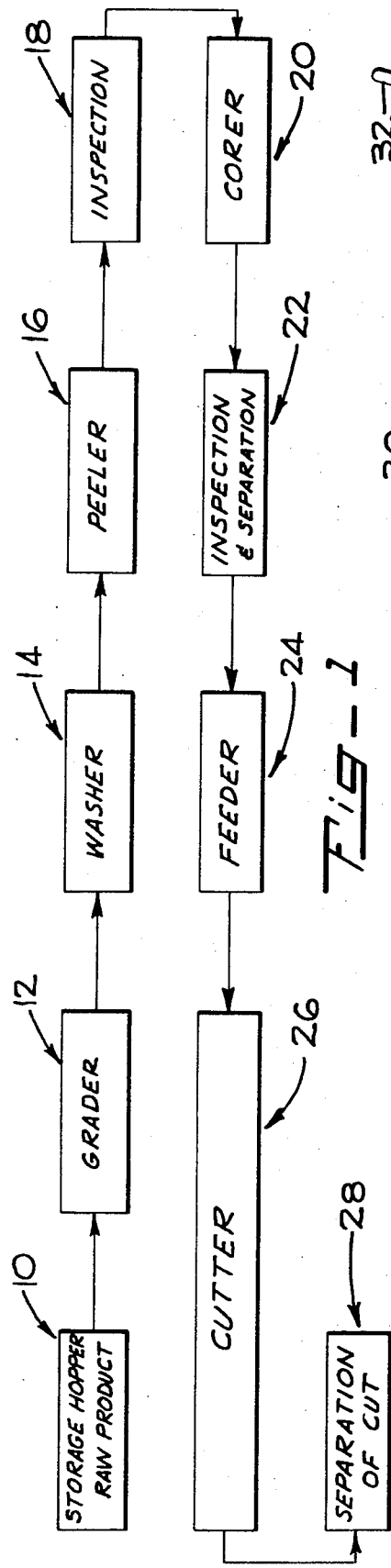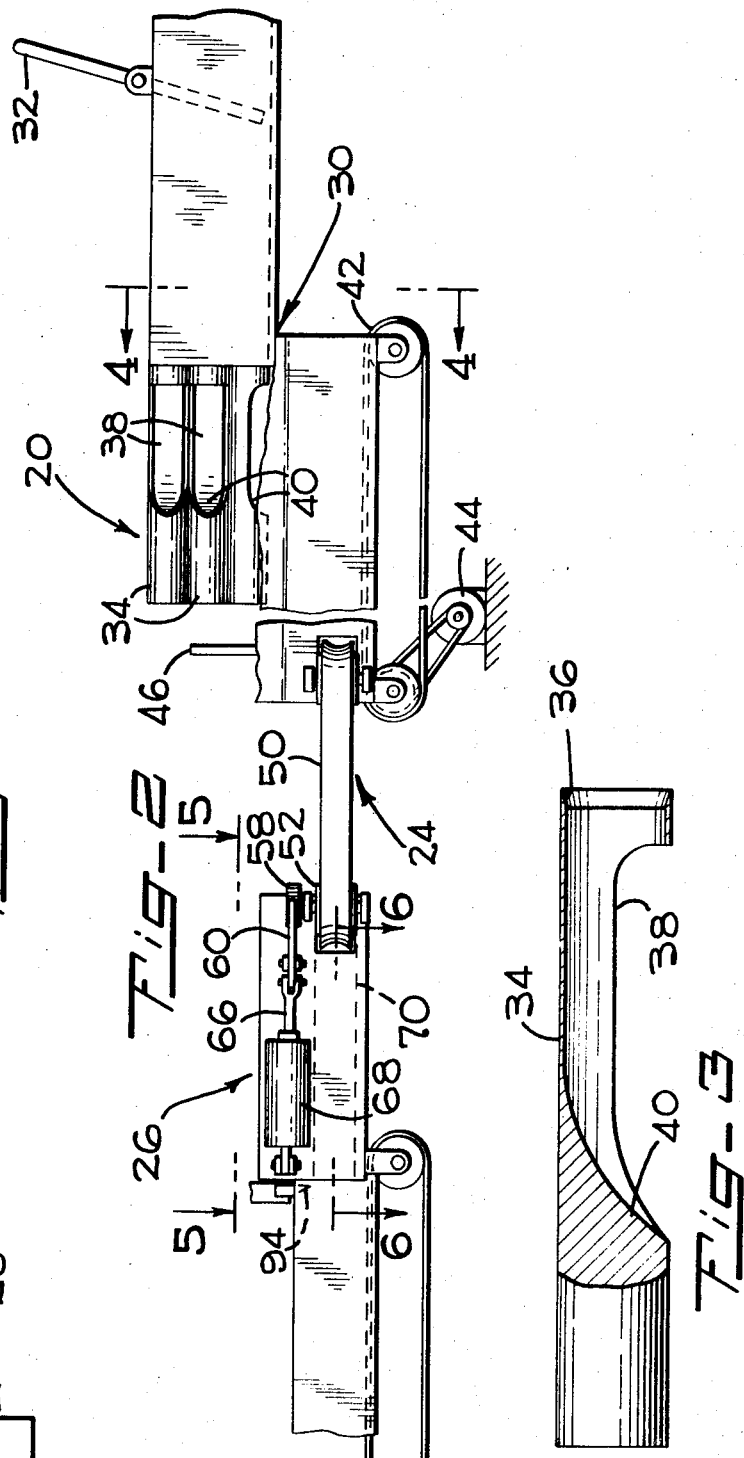

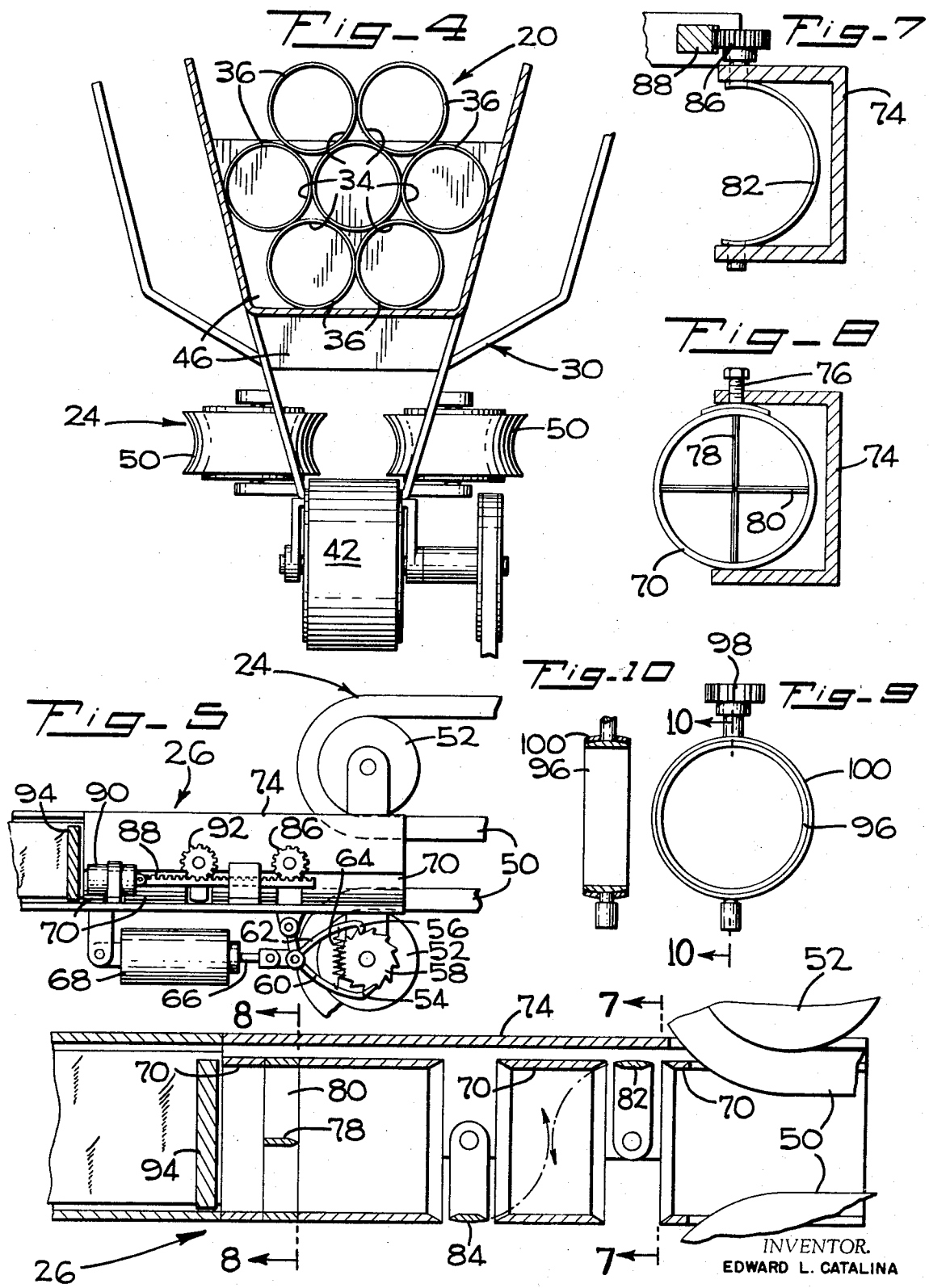

METHOD OF AND APPARATUS FOR PREPARING FRUITS OR VEGETABLES

The present invention relates generally to processes for preparing fruits or vegetables and more particularly to a method of and apparatus for preparing fancy cuts of fruits or vegetables prior to packaging and delivery to the consumer.

While sizable quantities of fruits or vegetables are still sold to the consumer in their natural states, an ever increasing amount is at least partially prepared commercially and delivered to the consumer in such prepared and more convenient state. By way of example, a consumer will still find in a store, bags of potatoes whose only processing has been an initial cleaning operation. However, peeled and partially shaped potatoes will also be found in cans, pre-cut "french fries" or "hashed brown" potatoes will be found bagged in the frozen food counters, and dehydrated potatoes, usually in flake form, will also be found in boxes on the shelves of substantially all grocery stores.

Regrettably, in substantially all instances, such commercial preparation involves certain difficulties to the producer. Again, specifically referring to potatoes, the canning of peeled potatoes necessitates a certain degree of uniformity of dimensions of the canned product and since potatoes in their natural state do not have such uniformity, a significant waste of the product is encountered. Similar waste is involved in the preparation of "french fries," "hashed brown" and dehydrated potato flakes and, in the latter case, additional difficulty has been experienced in achieving uniform thinness of the slices prior to the dehydration process and a consequent inefficiency of dehydration itself.

Finally, primarily because of the waste factor, a very limited variety of shapes of prepared fruits or vegetables have appeared and the consumers' psychological desire for certain fancy cuts has not been satisfied.

Accordingly, it is a general object of this invention to provide a method of and apparatus for preparing fancy cuts of fruits or vegetables.

More particularly, it is a feature of the invention to provide such a method and apparatus which enables a selected variation of the shapes and sizes of the cut fruit and vegetables.

Additionally, it is a feature of the invention to provide a method of and apparatus for preparing fancy cuts of fruits or vegetables in a fashion that minimizes waste of the raw product.

It is another feature of the invention to provide a method of and apparatus for preparing fancy cuts of fruits or vegetables wherein uniformity of the prepared product is achieved to facilitate other operations such as packaging of the product and/or other processing steps such as dehydration thereof.

Specifically, it is a feature of the invention to provide a method of and apparatus for preparing fancy cuts of fruits or vegetables having a controlled curved contour.

Additionally, it is a feature of the invention to provide such a method and apparatus wherein a regular, consistent contour of the fruit or vegetable is first established and the latter is then capable of being confined to assure accuracy of subsequent processing steps.

It is a further feature of the invention to provide such a method and apparatus which can be performed efficiently and effectively for high production processing.

Yet more specifically, it is a feature of the invention to preform the fruit or vegetables in a consistent transverse shape so that the same may subsequently be fed sequentially to enable a substantially continuous production of the finished product.

These as well as other objects and features of the invention will become more apparent from a perusal of the following description of the method, and an exemplary apparatus for carrying out such method, reference being made to the accompanying drawings wherein:

FIG. 1 is a block diagram illustrating the steps of the method embodying the present invention, FIG. 2 is a side elevational view of an exemplary apparatus for carrying out such method, FIG. 3 is an enlarged, central sectional view through an individual coring member constituting one element of the FIG. 2 apparatus, FIG. 4 is an enlarged, transverse sectional view taken along line 4—4 of FIG. 2, illustrating the coring and feeding members of the apparatus, FIG. 5 is an enlarged, fragmentary plan view taken along line 5—5 of FIG. 2 illustrating additional details of the feeding and cutting mechanisms, FIG. 6 is an enlarged fragmentary horizontal sectional view taken along line 6—6 of FIG. 2 illustrating details of the cutting mechanism, FIG. 7 is a transverse sectional view taken along line 7—7 of FIG. 6, FIG. 8 is another transverse sectional view taken along line 8—8 of FIG. 6, FIG. 9 is a view similar to FIG. 7, but illustrating a modified form of cutting mechanism, and FIG. 10 is a transverse sectional view taken along line 10—10 of FIG. 9.

Generally, the method of the present invention involves an initial step of coring a fruit or vegetable which provides a core member having a predetermined and consistent cross-section. The term "coring" is defined to refer to a severance of the fruit or vegetable by a blade or other cutting element defining a closed, geometric figure such as a circle, ellipse, rectangle or the like so that upon the completion of the coring step, an elongated figure having the mentioned uniform cross-section is formed.

As a second step, the uniform cross-section core member is transversely cut or severed at predetermined intervals along its length, the precise configuration of such transverse cut and the spacing between cuts being dependent upon the desired shape of the prepared fruit or vegetable.

Either as an alternative or as a supplement to the described second step of the method, a longitudinal cutting of the uniform cross-section core member can be performed, thus to reduce each single core member, whether transversely severed or not, into a plurality of core member sections.

In greater detail and with reference to FIG. 1, the method will be described in connection with the preparation of potatoes although it will be obvious that other fruits or vegetables can be processed in a similar fashion. From a storage hopper 10, the raw product in the form of potatoes of various sizes are delivered to a grader 12 of a conventional nature which effects segregation of the potatoes into groups of predetermined sizes, such grading being particularly important in the present process to minimize waste.

The selected group of potatoes is delivered to a washer 14 of a conventional nature which cleanses the raw product so that the same may then be delivered to a peeler 16 wherein the skin of the potato is removed, such peeling operation also being conventional.

After inspection of the peeled potatoes as indicated at 18, they are delivered to a corer 20 which is arranged in accordance with the present invention to sever the potatoes sequentially in a fashion to provide a plurality of core members of substantially cylindrical cross-section. Preferably, a plurality of core members of substantially cylindrical cross-section are provided by the corer 20 together with an attendant group of elongated strips of substantially triangular cross-section representing those portions of the cored potatoes existent between the cylindrical sections formed by the coring operation.

Subsequently, the cylindrical core members are separated from the intermediate triangular sections by visual inspection and separation, as indicated at 22, which latter triangular sections can conveniently be packaged for use as "hashed brown" potatoes, thus avoiding a waste of the raw product. A feeder 24 is arranged to receive the cylindrical core members and to deliver the same sequentially to a cutter 26 that is arranged to sever the core members transversely and/or longitudinally to thus provide the finished cut or cuts which can constitute one or more shapes.

If a plurality of shapes are delivered from the cutter, the cuts are separated, as indicated at 28, for subsequent processing or packaging operations of a conventional nature and as particularly desired for the particular fancy cuts resultant from the foregoing steps.

An apparatus for storage, grading, washing and peeling of potatoes is not illustrated since, as indicated previously, such apparatus can be conventional. For carrying out the remaining steps of the method the apparatus can be substantially as shown in FIGS. 2 through 10 to which additional reference is now made.

The corer 20 preferably includes a generally U-shaped trough 30 through which the peeled potatoes are sequentially fed in aligned single row relationship by suitable mechanism here indicated by a pivoted manually actuated lever 32. From the trough 30, each potato, in turn, is pushed into and through a plurality of adjacent cylindrical coring tubes 34 as best shown in FIGS. 2 and 4. Preferably, as shown in FIG. 4, a central coring tube is surrounded by six exterior coring tubes, all having a sharpened circular entrance blade 36 and arranged in substantial parallelism although a slight divergence of the exterior coring tubes 34 is preferred to enable free movement of the small triangular sections cut in the potatoes to pass freely between the tubes 34. These triangular sections can be manually or otherwise separated from the cylindrical potato core members and form a convenient shape for packaging as "hashed brown" potatoes.

As best shown in FIG. 3, each of the six exterior coring tubes 34 is generally of cylindrical configuration, as previously mentioned, but a lateral opening 38 therein spaced slightly from the circular cutting blade 36 at the entrance end of the coring tube permits a lateral egress of the potato core member from the tube. Each potato core member is forcibly ejected through such lateral opening through the expedient of a curved cam member 40 formed adjacent the remote extremity of the lateral opening 38 so that as the core member is shoved through the coring tube 34, its forward end is cammed laterally through the opening 38 so that it may fall, by gravity, onto a relatively narrow, endless conveyor belt 42 positioned between the downwardly extending sidewalls of the previously described trough 30, as clearly shown in FIG. 4. The central tube 34 does not have such lateral opening and its core member must pass through its entire closed cylindrical length to be ejected therefrom at its extreme end, also to drop onto the mentioned endless conveyor belt 42 or onto another potato core member on such belt.

The sidewalls of the mentioned trough 30 gradually converge in a downward direction, as clearly shown in FIG. 4, and the distance therebetween adjacent the sides of the endless conveyor belt 42 is but slightly greater than the diameter of one of the potato core members so that at any given point lengthwise of the belt, only one potato core member can rest thereon and any other potato core members will, at such position, ride on top of such lowermost core member.

As best shown in FIG. 2, the endless belt 42 is driven from a suitable motor 44 so that its upper flight moves from right to left as viewed in FIG. 2, and the surface characteristics of the belt are such that a potato core member resting thereon is frictionally urged in the direction of belt motion and, in turn, a certain amount of frictional motion of any core members on top of the lowermost core member will also be experienced. Adjacent the exit end of the trough 30 and the extremity of the conveyor belt 42, a blocking plate 46 closes the upper portions of the trough, thus to permit only the lowermost potato core member on the conveyor belt 42 to pass therebeyond, other potato core members at elevated positions being retained until the lowermost core member has been removed from the belt so that another core member can therefore drop into the vacated lowermost position in the trough 30.

Each lowermost core member is delivered in sequence to the mentioned feeder 24 which preferably takes the form of a pair of laterally disposed endless belts 50 arranged to engage the side of a core member at the exit end of the trough 30 and to intermittently propel the same forwardly into the mentioned cutter 26. The two belts 50 are arranged for rotation around horizontal pulleys 52 on opposite sides of the path of the core member and the belt surface has a curved conformation so that when placed in their opposed, facing relationship as clearly shown in FIG. 4, the two belts 50 present opposed curved gripping surfaces which resiliently engage the core members delivered by the initial conveyor belt 42 thereto so as to grasp and move the same forward as the feeder belts 50 are in turn moved intermittently.

Such intermittent motion is achieved through engagement of two pawls 54, 56 with a suitable ratchet wheel 58 connected to one of the belt supporting pulleys 52 as clearly illustrated in FIG. 5. The two pawls 54, 56 are disposed on opposite sides of the ratchet wheel 58 and their supporting arms 60, 62 are urged toward one another by a tension spring 64 which thus holds both pawls in contact with the ratchet but enables one or the other to move thereover. The opposite extremities of the pawl arms 60, 62 are jointly connected to the end of the actuating rod 66 of a hydraulic cylinder 68 suitably mounted on one side of the mechanism, as shown both in FIGS. 2 and 5. A stroke of the hydraulic cylinder rod 66 in one direction effectuates motion of both pawls 54, 56, but only one will engage and move the ratchet wheel 58 and the associated belt 50 and, in turn, motion of the hydraulic cylinder rod 66 on its return stroke effects engagement of the other pawl 56 with the ratchet wheel to effect further motion of the latter in the same rotative direction, a counter-clockwise direction as viewed in FIG. 5. Therefore, depending upon the setting of the hydraulic cylinder 68, a predetermined amount of belt motion will be experienced upon each extension and retraction stroke of the cylinder rod 66. This belt motion, in turn, results in a corresponding feeding motion of a potato core member positioned between the belts 50. It is noted that only one belt 50 need be driven, the frictional resilient gripping of the potato core member transmitting motion to the other belt which can be an idler belt although, if desired, a similar actuating mechanism can be employed with the other belt so that propulsion is effected from both sides of the potato core member.

The described feeder mechanism 24 intermittently feeds a potato core member into the cutter 26 which, in accordance with the present invention, is arranged to provide a variety of operator-selected transverse and/or longitudinal severing actions to enable formation of various shapes and sizes of the finished product, particularly when utilized in conjunction with the described feeder mechanism 24 which enables a variation in the amount of feed of the potato core members as desired by the operator. With additional detailed reference to FIGS. 6 and 7, the cutter 26 includes a plurality of cylindrical guide members 70 together with a plurality of cutting members, each of which can be removably mounted in a rectangular, generally C-shaped frame 74 which extends longitudinally in substantial alignment with the established path of movement of the potato core members emergent from the exit end of the feeder belts 50.

More particularly, each of the cylindrical guide members 70 is clamped to the upper and lower portions of the frame 74 by a suitable screw clamp 76, as shown in FIG. 8, so that all of said guide members are aligned with the path of the potato core members emergent from the feeder belts 50. The interior diameter of the cylindrical guide members 70 is slightly greater than the exterior diameter of the potato core members so that the latter can be pushed therethrough, but will, in turn, be quite closely guided so as to follow a substantially rectilinear path through the sequence of aligned cylindrical guide members.

To provide for longitudinal severance of the potato core members, one of the cylindrical guide members 70, that shown to the left in FIG. 6 and illustrated in cross-section in FIG. 8, can include diametrically-disposed and mutually perpendicular cutting blades 78, 80 within the guide member which will effect a longitudinal severance of the potato core member as it is pushed therethrough. If no longitudinal cutting of the potato core member is desired, this unit is removed from the frame and replaced by a cylindrical guide member having no cutting blades therewithin.

In order to transversely cut the potato core members being pushed sequentially through the cylindrical guide members 70 by the previously described feeder belts 50, and more particularly, in order to provide an arcuate transverse cut, a pair of semi-circular cutting blades 82, 84, each having a diameter equal to that of the guide members and two cutting edges, are mounted for rotation about a vertical axis diametrically bisecting the path of the potato core members through the cylindrical guide members 70. More particularly, each of the semi-circular cutters 82, 84 is rotatively supported at its upper and lower extremities as best shown in FIG. 7 and, as shown in FIG. 6, the first cutter blade 82 can rotate 180° from a lateral disposition where it is aligned with two of the cylindrical guide members 70 on opposite sides thereof transversely along a semi-circular path to a diametrically opposite disposition whereat the cutter blade is disposed in alignment with the other side of the adjacent cylindrical guide members 70, thus making a hemispherical transverse cut in any potato core member engaged and cut thereby. The ends of the adjacent cylindrical guide members 70 are tapered so that they may be positioned close to the cutter in its lateral disposition, as shown in FIG. 6, and yet permit the described transverse arcuate cutting motion of the semi-circular cutter blade 82. If not actuated, the cutter blade 82 remains positioned at one side of the guide path for the potatoes, and will merely function as an additional guide member to maintain the potato core members in their rectilinear motion.

To actuate the hemispherical cut of the semi-circular cutter blade 82, a small pinion gear 86 is mounted on the upper end thereof for operative engagement with the teeth of an elongated rack 88 mounted for rectilinear sliding movement and actuated in its movement by connection to a suitable hydraulic cylinder 90 whose forward stroke is sufficient to move the cutter blade through the requisite 180° arc from one side of the potato core member path to the opposite side thereof. In turn, a retraction of the hydraulic cylinder 90 will effect return of the cutter blade to its initial position, as shown in FIG. 6. Since the cutter blade 82 has two cutting edges, cuts can be made in both directions.

If the cutter blade 82 is actuated through 180°, as described, and the feeding means 24 is then actuated to move the potato core member forwardly before the reverse 180° motion of the blade is actuated, a series of generally cup-shaped potato members will be formed. Depending on the setting of the feeder 24, these sections can be thin for ready adaptability to a subsequent dehydration operation or relatively thick for canning.

It will be obvious that the rack and pinion arrangement can be adjusted to provide a longer stroke to, in turn, effect a full 360° cut rather than the 180° cut as described. I will be apparent that this full 360° cut will provide a substantially spherical or ball-shaped potato member and repetitive cuts in the intervals between the intermittent feed provided by the described feeder mechanism 24 will provide a series of balls separated by cylindrical sections having opposed concave surfaces which can conveniently be used as a novel shape for "french fries" having a generally ring-shaped configuration.

As an alternative, as specifically shown in the drawings, the production of ball-shaped potatoes can be expedited by utilizing both of the cutter blades 82, 84. The second cutter blade 84 is substantially identical to that described and can be similarly mounted on the C-shaped frame at a distance slightly in excess of the guide member diameter for 180° rotation and having a pinion gear 92 adapted for engagement with the previously described rack 88 so that both cutters 82, 84 are energized simultaneously by extension or retraction of the rack-actuating hydraulic cylinder 90. Preferably, as shown, this second cutter blade 84 is initially positioned on the opposite side of the path of potato core movement and upon actuation, moves 180° to the other side to provide a hemispherical cut in the potato core member which is the reverse of the cut simultaneously made by the first cutter blade 82. In turn, upon the opposite stroke of the hydraulic cylinder 90, the second cutter blade 84 is returned to its initial, illustrated disposition. Thus, conjointly, the two cutter blades 82, 84 provide a forwardly curved cut on a potato core member engaged thereby and a rearwardly curved cut of like configuration. If the feeder mechanism 24 is arranged to move a potato core member the distance between the cutter blades 82, 84, a forward, hemispherical cut is first made on a potato core member and after the intervening feeding motion, a second, rearwardly directed hemispherical cut is made to complete the formation of a potato ball. While the second cutter blade 84 completes the formation of one ball, the first cutter blade 82 is, in turn actuated to instigate the initial hemispherical cut on a subsequent section of potato core member in preparation for completion of another ball-like potato member upon subsequent motion and cutting action.

As an alternative operation, if the feeder belts 50 are actuated to move less than the diameter of a potato ball, as described hereinabove, alternate feeding and cutting action will result in a potato member whose dimension along the axis of potato motion will be less and a button-shaped product will result, each successive button being, in turn, separated by a cylindrical potato member having concave ends. Thus, by adjustment of the feeder mechanism 24, actuation of the same cutter blades 82, 84 in the same fashion will produce variant shapes of potato members as required for various types of utilization. In all cases, the cuts will be accurate in that the potato core members remain held within the cylindrical guide members 70 and are thus prevented from turning when the transverse cuts are made.

As a further alternative, the feeder belts 50 can be arranged to effect, upon each actuation, a longer motion of the potato core member and alternating actuation of the cutter blades will now produce an elongated potato core member having hemispherical ends, such shape being very well adapted for canning operations.

In particular, it may be mentioned that since the cylindrical guide members 70 hold the potato core members firmly as they are moved therethrough, a straight, transverse slicing of the core members can be achieved by suitable knife 94 diagrammatically illustrated in FIG. 2 at the output end of the cylindrical guide members 70. If the feeder belts 50 are arranged to provide a short, forward motion of the potato core member upon each actuating stroke, repeated intervening transverse slices by such knife 94 will provide thin, sliced potato members having a consistent circular outline and a consistent regular thickness enabling use for preparation of potato chips or for subsequent dehydration processing. Thus, a single feeding and cutting unit operating conjointly can provide a plurality of plain or fancy cuts of potatoes having consistent dimensions as selected by the operator.

It will be apparent that various modifications in the structure as described can be made without departing from the spirit of the invention and by way of example, a modified cutter blade 96 is shown in FIGS. 9 and 10 having a complete circular configuration rather than the semi-circle as previously described. As clearly shown in FIGS. 9 and 10, this cutter blade is mounted for rotation on stub shafts, the upper one of which is connected to a pinion gear 98 for actuation by a rack mechanism (not shown) substantially identical to that described hereinabove. Preferably, the circular cutter blade 96 in this modified structure is mounted within a cylindrical guide member 100 which closely surrounds the same to provide both a mounting and guide structure for the cylindrical potato core members formed and fed in the fashion previously described.

Yet many further modifications can be envisioned without departing from the spirit of the invention and the foregoing description of the method and exemplary apparatus for carrying out the same is to be considered as purely exemplary and not in a limiting sense and the actual scope of the invention is to be indicated only by reference to the appended claims.

I claim:

1. Apparatus for preparing fancy cuts of fruits or vegetables which comprises
    a hollow cylindrical coring tube having a circular cutting edge at one end thereof,
    means for pushing a fruit or vegetable through said tube,
    means for feeding the resultant cylindrical core member along its longitudinal axis,
    a cylindrical guide member closely encompassing the core member during longitudinal feeding thereof, and
    means for transversely cutting the cylindrical core member while encompassed by said cylindrical guide member.

2. Apparatus for preparing fancy cuts according to claim 1 wherein a plurality of coring tubes are positioned in substantially parallel adjacent relation.

3. Apparatus for preparing fancy cuts according to claim 1 wherein said cutting means includes an arcuate cutting blade.

4. Apparatus for preparing fancy cuts according to claim 1 which comprises means for feeding said core member intermittently to said cutting means.

5. Apparatus for preparing fancy cuts according to claim 4 which comprises means for actuating said cutting means when said feeding means is inactive.

* * * * *